United States Patent [19]

Bouldin

[11] 4,383,024
[45] May 10, 1983

[54] METHOD OF MAKING A HIGHLY ABSORPTIVE DYE-CONTAINING UNDERLAYER FOR LASER RECORDING AND DATA STORAGE

[75] Inventor: Eric W. Bouldin, Atherton, Calif.

[73] Assignee: Drexler Technology Corporation, Mountain View, Calif.

[21] Appl. No.: 392,194

[22] Filed: Jun. 25, 1982

Related U.S. Application Data

[62] Division of Ser. No. 301,230, Sep. 11, 1981, abandoned.

[51] Int. Cl.³ .......................... G03C 1/84; G03C 1/02; G02B 27/22
[52] U.S. Cl. ................................. 430/271; 430/364; 430/517; 430/495; 346/135.1
[58] Field of Search ............... 430/414, 415, 416, 271, 430/320, 364, 495, 517, 964, 616, 275; 346/76 L, 135.1

[56] References Cited

U.S. PATENT DOCUMENTS

| | | | |
|---|---|---|---|
| 4,113,490 | 9/1978 | Fujiwhara et al. | 430/364 |
| 4,230,939 | 10/1980 | de Bont et al. | 346/76 L |
| 4,268,616 | 5/1981 | Ogawa et al. | 430/364 |
| 4,278,756 | 7/1981 | Bouldin et al. | 430/414 |
| 4,284,716 | 8/1981 | Drexler et al. | 430/510 |

*Primary Examiner*—Richard L. Schilling

[57] ABSTRACT

A method of making an underlayer for a laser recording and data storage medium with a light absorption characteristic suited to a recording laser. The underlayer is formed by creating a nuclei layer in a silver-halide photosensitive emulsion layer and then contacting the emulsion layer with a chromogenic reducing agent and a chromogenic dye coupler. The reflective layer may be formed prior to this step by subjecting the nuclei layer to a monobath having a silver-halide solvent and a silver reducing agent until a reflective surface layer of non-filamentary silver particles is formed, or after the step by chemical vapor deposition or sputtering of a reflective metal layer over the underlayer.

6 Claims, 4 Drawing Figures

STRONG CHEMICAL DEVELOPER FOR ESTABLISHING FILAMENTARY SILVER

EXPOSE – FORM NUCLEI

MONOBATH DEV. FOR ESTABLISHING NON-FILAMENTARY SILVER

STRONG CHEMICAL DEVELOPER FOR ESTABLISHING FILAMENTARY SILVER

METHOD OF MAKING A HIGHLY ABSORPTIVE DYE-CONTAINING UNDERLAYER FOR LASER RECORDING AND DATA STORAGE

DESCRIPTION

Related Application

This is a division of application Ser. No. 301,230 filed Sept. 11, 1981.

TECHNICAL FIELD

The invention relates to a method of making a reflective laser recording and data storage medium.

BACKGROUND ART

The use of fine grain photo emulsion for the preparation of a reflective laser recording material was first disclosed by J. Drexler in U.S. patent application Ser. No. 131,288, generally corresponding to German Offenlegungsschrift No. 3,002,911. In that application, a processed black filamentary silver emulsion was converted to a reflective non-electrically conductive recording medium by heating at a temperature in the range of 250° C. to 330° C. in an oxygen containing atmosphere until the surface developed a reflective appearance. This laser recording material worked effectively with lasers of visible wavelengths, but its recording sensitivity fell by a factor of three for semiconductor lasers, which generate light in the near infrared at about 830 nm. The high temperatures of the process preclude the use of plastic film substrates commonly used for photographic films.

In U.S. Pat. No. 4,278,756 to E. W. Bouldin and J. Drexler, a reflective data storage medium is described. A reflective silver recording layer is derived from silver-halide emulsion through a silver diffusion transfer process. No heating was required to create the reflective surface; reflectivities up to 25% of green light were achieved. However, the recording sensitivity of this material was less than that of the process described in the aforementioned U.S. patent application Ser. No. 131,288, which yielded reflectivities up to 17%.

In U.S. Pat. No. 4,278,758 to J. Drexler and E. W. Bouldin, a reflective medium was disclosed derived from a silver-halide emulsion through a diffusion transfer process. In this medium the recording sensitivity at green laser wavelengths was greatly improved over that described in U.S. Pat. No. 4,278,756 and even somewhat higher than that achieved by the medium described in the aforementioned U.S. patent application Ser. No. 131,288. It was necessary, however, to add an annealing step at a temperature of 250° C. and above to achieve the desired results. Although the recording sensitivity was very good with a green laser at 514 nm and with a red laser beam at 633 nm, it fell off by a factor of three when the laser wavelength was increased to 830 nm.

In U.S. Pat. No. 4,284,716, Drexler and Bouldin addressed the problem of retaining recording sensitivity in the red and infrared wavelengths while retaining use of common plastic substrates through avoidance of the thermal annealing step. This was achieved by combining the two known forms of chemically reduced silver metal, spheroidal and filamentary, at the surface of the reflective recording material.

The process by which this was achieved involves use of fine grain photographic emulsion which is given a weak light exposure and then treated in a strong chemical developer. This developer contains no silver-halide solvent and thus proceeds through chemical development or "direct development" to produce amorphous filaments of silver metal, which are highly absorptive of red and near-infrared light. The photographic emulsion is then briefly contacted with a chemical fogging solution which is a strong silver ion reducer. Small silver nuclei are now created at the top of the emulsion surface because of the non-penetrating nature of the fogging solution's solvent and the briefness of the contact. When the photographic emulsion is immersed in a monobath containing a developing agent and a silver-halide solvent, silver ions from throughout the emulsion are transported to the thin layer of nuclei at the emulsion surface and there reduced to silver metal by the developing agent. Silver metal reduced from a solution onto nuclei is a process known as "solution physical development." The silver formed this way is often in the form of regular octahedrons or spheroids. When these spheroids are large and/or numerous enough, they can grow into each other to form agglomerates which by virtue of their regular faces or high volume concentration reflect visible and near-infrared light. This invention, then, made use of the absorptive filamentary silver in an intimate dispersion with reflective spheroidal silver to produce a sensitive laser recording material that could be prepared through room temperature chemistries. This media is more sensitive in the green and blue than it is in the red and infrared.

In order to increase recording sensitivity, others have previously devised recording media using dyes which are absorptive of the recording wavelengths. For example, in U.S. Pat. No. 4,230,939 to de Bont et al. an auxiliary layer is provided containing an organic dye. See also "Infrared Dyes for Optical Storage", V. B. Jipson and C. R. Jones, J. Vac. Sci. Technology 18(1) Jan/Feb 1981.

An object of the present invention was to devise a more sensitive reflective direct read after write (DRAW) laser recording and data storage medium. Another objective is to devise a laser recording medium which is more sensitive at particular wavelengths. A further objective is to devise a general purpose highly absorptive underlayer for many types of laser recording media. Another object is to reduce the manufacturing process to fewer steps, with smaller cost in terms of time and material, and with a greater degree of process uniformity in creating red and infrared reflectivities in the 20–50% range.

DISCLOSURE OF INVENTION

The above objectives have been achieved with a reflective laser recording and information storage medium having an underlayer comprising a colloid matrix, containing filamentary silver and an organic dye, highly absorptive to laser light. Reflectivity is derived, as in the prior art, from a reflective surface layer of spheroid silver particles in a colloid matrix, such as gelatin or by sputtering of a thin metal layer, such as tellurium, bismuth, rhodium or other laser recording metals known in the prior art. The thin metal layer covers an underlayer highly absorptive to laser light.

A new approach in attaining high recording sensitivity is derived from the use of dye-coupling photographic development of a silver-halide emulsion. High recording sensitivity is derived from the use of dye-coupling photographic development of a silver-halide emulsion to create a highly absorptive layer under the reflective layer. If the laser light passing through the reflective surface is absorbed within a small fraction of a micron the dissipated heat will accelerate the melting of the reflective layer and thereby increase the recording sensitivity. Thus if high recording sensitivity is desired, a high optical density at the wavelength of the recording laser can be produced.

In the prior art, developed filamentary silver grains below the reflective surface have been used to enhance the recording sensitivity. In the prior art dyes have been used in non-reflective laser recording media to increase recording sensitivity. The present invention employs the addition of a dye to the underlayer of a reflective medium in a certain efficient way. Dyes are introduced as dye-couplers in conjunction with a photographic development process to cause a dye to be distributed in specific locations, namely where high optical density black filamentary silver particles are located. The dye generally increases the optical density of the underlayer by a factor of ten or more at the wavelength at which the dye absorption is maximum.

Thus the present invention involves using dye couplers to create the absorptive underlayer in conjunction with the photographic development of filamentary silver. This concept can be used in different ways. One preferred method proceeds as follows: Initially a silver-halide emulsion is exposed to light for nuclei formation. The nucleated emulsion is then developed using a silver diffusion transfer process involving a rapid acting solvent and a weak developer until a surface layer of spheroid silver particles having the desired reflectivity is attained, but leaving some undeveloped silver halide. Next a strong filamentary silver developer and a dye intermediate, namely a dye coupler, are used to develop filamentary silver particles. After the strong developer reduces silver to black filamentary particles, the developer couples to the dye intermediate, previously invisible, forming a visible dye. More than one dye intermediate may be used. The dye which is formed is one which is selected to be absorptive of the recording wavelength. The dye and filamentary silver form a light absorptive underlayer of high optical density beneath the reflective silver surface layer.

The result is a reflective laser recording material, of particularly high recording sensitivity to the wavelength of the recording laser. The read laser may be of the same wavelength, at reduced power, or of a different wavelength if desired.

BEST MODE FOR CARRYING OUT THE INVENTION

A. Starting Material

The starting material for making the reflective laser recording and data storage material is a silver-halide emulsion layer of the kind found on a commercially available black and white photoplate or black and white film product such as a strip film without a gelatin overcoat. Photoplates used for semiconductor photomasks or holographic recordings are preferred. Emulsion layers on such photoplates are characterized by uniform fine grain size and uniform thickness over a flat substrate, usually glass. Typical thickness is less than ten microns. The smaller the grain sizes of the silver-halide emulsion the higher the resolution of recording of the final product which results from the application of this invention. The emulsion grain size should be less than 5% to 10% of the recording hole size for best results. As is shown in the examples which follow, commercially available high resolution silver-halide emulsion photoplates used in making semiconductor integrated circuits are particularly useful in the practice of this invention. These photoplates, using Lipmann emulsions, have grain sizes primarily under 0.05 micron and will yield non-filamentary silver particles for the high resolution reflective layer produced in the final process step. The silver halide in such plates is held in a colloid matrix, normally gelatin. But the invention is by no means limited to these photoplates nor indeed is it limited to using only commercially available silver-halide photosensitive materials. Any photosensitive silver-halide emulsion with grain sizes primarily under 0.05 micron may be used in the practice of the present invention for high resolution laser recording. For lower resolution recordings the silver-halide grain sizes may be larger than 0.05 microns. For purposes of this patent application, the term "silver-halide emulsion" means a silver-halide emulsion without an added gelatin overcoat, unless an overcoat is specified.

B. Nuclei Formation

Figure 1:
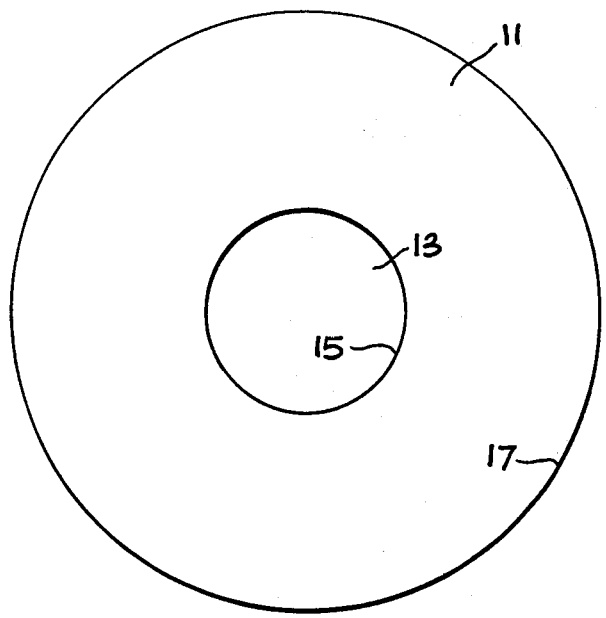
FIG. 1 is a top view of a disk shaped reflective laser recording and data storage medium.

FIG. 1 shows a disk shaped photoplate 11. A disk shape is preferable for rotating media, with the central aperture 13 serving as a centering device. Some or all of the surface between the inner circumference 15 and the outer circumference 17 may be used for recording or data storage.

Figure 2:
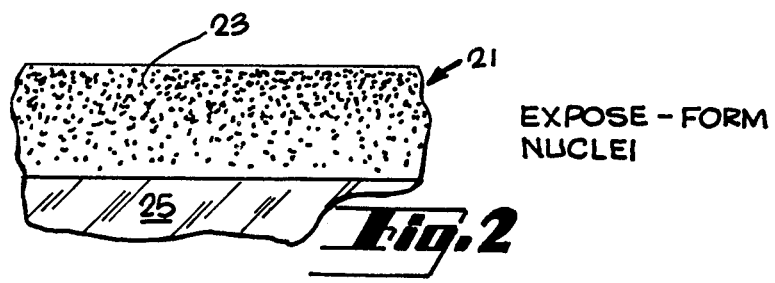
FIGS. 2-4 are sectional views of the results of processing steps for an emulsion in accord with the present invention.

The first step in the process of making the present invention is the creation of nuclei within the emulsion. Nuclei may be created by exposure of a silver-halide photosensitive medium to actinic radiation. This initial exposure is saturating, activating the entire thickness of the silver-halide emulsion which is exposed to light. This activation produces nuclei, illustrated as a uniform distribution in the horizontal plane of black dots in FIG. 2, forming a major surface which is within the emulsion layer and not clearly defined. This surface has no distinct lower boundary because nuclei extend downwardly to the emulsion-substrate interface. The greatest areawise density of nuclei is at this major surface, distal to the substrate, where light is not attenuated. The least areawise density of nuclei is distal to the major surface where light is most attenuated. A depthwise gradient exists between the upper major surface and the emulsion-substrate interface.

It has been suggested privately by another employee of the assignee of this application that a second set of nuclei may be formed by contacting the surface of the emulsion with borohydride, as by dipping, either before or after the actinic radiation exposure. This would increase the nuclei concentration on the surface and increase reflectivities at the shorter wavelengths. However, borohydride may contribute to dichroic fog. Its action is very fast and is hard to apply in an even amount. Borohydride may create mottle and is not preferred when red or infrared recording is desired.

The initial exposure may be obtained from room light, or from a brief exposure to an intense source of actinic radiation. Alternatively chemical fogging may be used in place of actinic radiation. Actinic radiation is the generic term which describes any exposure which creates a latent image. Latent image is the term which describes activation of unexposed silver halide. Exposure of the silver-halide photosensitive medium may be of uniform intensity over the surface of the medium, as illustrated by the nuclei pattern 23 in emulsion layer 21 in FIG. 2. This would yield a uniform areawise density of the latent images within the photosensitive medium.

An alternative to a uniform exposure and thus a uniform density of latent images is a patterned exposure of variable intensity. For example, the exposure of the silver-halide photosensitive medium may be composed of alternating concentric bands of high and low intensity actinic radiation over the surface of the photosensitive medium. By changing the intensity of the exposure in an alternating fashion, by means of a shielding mask having two degrees of transmissivity to the actinic radiation, the density of latent images within the photosensitive medium will differ in proportion to the intensity of the exposure levels. By patterning this differential exposure with higher and lower density latent images, it is possible to create a pattern of two different reflectivities, thereby prerecording certain information.

The emulsion is supported by a supporting substrate 25. This supporting substrate may be either glass or a polymer or ceramic material or metal. It is not necessary that this supporting substrate be transparent to either the exposing actinic radiation or to the radiation produced by the optical reading device. It is clear also that the combination of reflective silver coating over absorptive underlayer may be placed on both sides of such a supporting substrate. For example, it is possible and practical to use a photoplate which has disposed on its opposite sides silver-halide photosensitive material. The fact that the photosensitive material which finally results in the reflective silver coating over an absorptive substrate covers opposite sides of the supporting substrate has no detrimental effect on the utility of the final product and in fact provides twice the data storage capacity. The substrate should have a flat major surface on which the emulsion layer resides. While flatness is preferred, it is not essential.

C. Physical Development of Nuclei to Form Reflective Layer

The second step of the present invention involves contacting the nucleated emulsion with a monobath having a photographic developer of low reducing activity and an active silver-halide solvent, preferably thiocyanate. The procedure may be carried out in room light, except where pre-recording of information is desired. In the latter case, monobath development should take place in darkness. Contact may be by briefly dipping the emulsion in a tank containing monobath. In this manner, the emulsion surface distal to the substrate receives maximum monobath contact and the underlayer receives substantially less monobath contact, thereby leaving underlayer nuclei untreated.

Preferred monobath formulations for highly reflective surfaces include a developing agent which may be characterized as having low activity. The specific type of developing agent selected appears to be less critical than the activity level as determined by developer concentration and pH.

The developing agent should have a redox potential sufficient for causing silver ion reduction and adsorption or agglomeration on silver nuclei. The concentration of the developing agent and the pH of the monobath should not cause filamentary silver growth which gives a black low reflectivity appearance. The developed silver particles should have a geometric shape, such as a spherical hexagonal shape which when concentrated form a good reflectivity surface.

Developing agents having the preferred characteristics are well known in the art and almost any photographic developing agent can be made to work by selection of concentration, pH and silver complexing agent, such that there is no chemical reaction between the developing agent and complexing agent. It is well known that photographic developing agents require an antioxidant to preserve them. The following are typical developing agent/antioxidant combinations which may be used in conjunction with a sodium thiocyanate (NaSCN) solvent complexing agent.

For Monobaths Using Na(SCN) As a Solvent And Silver Complexing Agent

| Developing Agent | Antioxidant |
| --- | --- |
| p-methylaminophenol | Ascorbic Acid |
| p-methylaminophenol | Sulfite |
| Ascorbic Acid | — |
| p-Phenylenediamione | Ascorbic Acid |
| Hydroquinone | Sulfite |
| Catechol | Sulfite |
| Phenidone | Sulfite |

The following active solvents are preferred, besides thiocyanate: thiosulphates and ammonium hydroxide. These silver-halide solvents can be used individually or together in the form of a solvent co-system.

Figure 3:
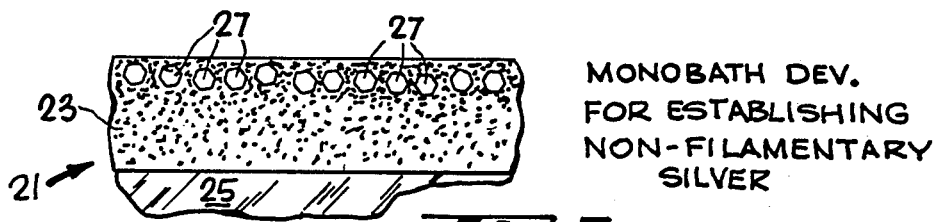

The monobath treatment is carried out until reflective spheroid particles and their agglomerates 27 in FIG. 3 are formed on the nuclei in the gelatin matrix. A greater density of silver spheroid particles occurs near the emulsion surface distal to the substrate because of the depthwise exposure gradient, created by actinic radiation, thereby forming a reflective surface layer.

The monobath treatment should leave some undeveloped silver halide due to low reducing activity of the developer. The monobath treatment is stopped as soon as a reflective surface layer has been formed and the desired amount of reflectivity attained.

D. Chemical Development of Nuclei to Form Dark Underlayer

Figure 4:
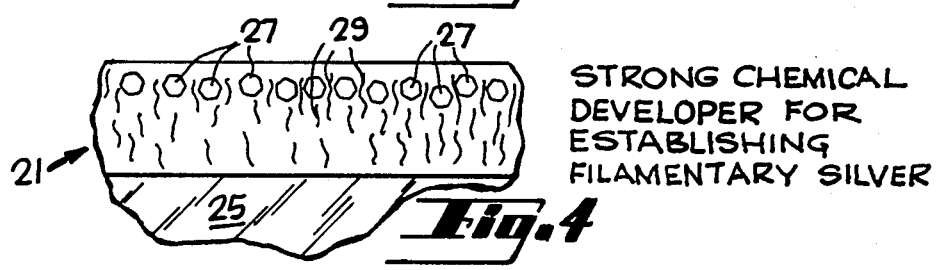

After the monobath treatment the nucleated and monobath treated emulsion is contacted with a strong chemical developer until the remaining silver halide is converted into black filamentary silver particles to form a light absorptive underlayer in said emulsion. Such developers are well known in black and white photography for their ability to produce black or dark gray filamentary silver layers from exposed silver halide. The preferred optical density is at least 1.0 for a 6 micron thick filamentary silver layer when measured with red light. The developer to be used is usually recommended by the manufacturer of the emulsion being used. Filaments 29 are seen in FIG. 4. A maximum amount of filamentary silver is desired. Most of the filamentary silver particles are beneath the major surface of the nuclei layer, although some are in the major surface. Nuclei beneath the major surface are sites for formation of filamentary silver particles.

The strong filamentary silver developer is combined with dye couplers, i.e., reactive intermediates which form dye, immediately after filamentary silver is produced. The coupler may be added to the dye developer or pre-positioned in the emulsion at the starting stage. The dye forms when the added dye intermediate couples with the oxydized developing agent. Thus, the developer itself, as well as the coupler, are dye intermediates in the well-known process termed secondary color development. Among the dyes which may be used are: the indophenols formed by the reactions of paraaminophenol and a phenol; the indoanilines, by reaction of a paraphenylenediamine and a phenol; the indamines with a phenylenediamine and an amine; the indothiophenols by paraphenylenediamine and a thiophenol; and the azomethines from the reaction of a paraaminophenol or a phenylenediamine with a methine containing active or strong polar groups. The developer-dye intermediate pair are known as the chromogenic reducing agent and the chromogenic dye coupler.

The particular dye which is used should be one which is absorptive of the wavelength of the recording laser. The combination of the dye and the filamentary silver in an underlayer, beneath the reflective silver particle layer increase the recording sensitivity of the material by converting laser power to heat just under the reflective layer. The filamentary silver, being dark gray or black, absorbs all wavelengths, while the dye is particularly sensitive in certain spectral regions. For example, a blue dye would be absorptive of red light and thus a helium-neon laser could be used for recording at a power level which would create pits or bumps in the reflective surface of the material. On the other hand, for reading purposes, a blue light laser could be used, at the same power level, or perhaps more than the recording laser, without deforming the recording material, since the material is not as sensitive to the blue wavelength compared to the red. Alternatively a red dye would work well with a helium-cadmium laser at 440 nm or an argon laser at 448 nm or 514 nm.

This filamentary silver dye underlayer is a dark underlayer, beneath a surface reflective layer of non-filamentary silver particles in an example of a preferred embodiment. Recording of information relies upon contrast ratios between low reflectivity spots in a reflective field, if recording is from one side of the material. The reflective layer is non-electrically conductive, as well as low thermally conductive. This enhances the sensitivity of the material to laser recording, since recording energy is not laterally diffused. In the horizontal plane the filamentary silver particles are uniformly distributed on a statistical basis. Alternatively the filamentary silver-dye underlayer could be under a continuous layer of vacuum sputtered tellurium, bismuth, rhodium, etc.

The laser recording and data storage medium of the present invention may be similar to that described in U.S. Pat. No. 4,284,716, with the addition of an evenly distributed dye in the underlayer. The important aspect of this invention is the formation of the dyed underlayer. Step C herein, physical development of nuclei to form reflective layer, may be omitted if another type of reflective layer is used. For example, a reflective layer may be formed by sputtering or by chemical vapor deposition as described in U.S. Pat. No. 4,278,734. The principal difference of such a reflective layer is that it will be on top of the silver-halide emulsion layer, rather than within it. Materials for a sputtered or vapor deposited reflective layer may be any of the well-known metals or metal oxides typically used for laser recording material such as tellurium or bismuth. More generally, the material may be selected from groups IIIB, IVB, VB or VIB, or their oxides.

E. Mode of Use

The resulting mirror-like coating on the substrate is suitable for laser recording, for example using a helium-neon laser having a red line at 633 nanometers. The recording laser beam diameter is typically less than one micron at the surface of the medium, with pulse lengths on the order of 100 nanoseconds. A shallow pit, penetrating the reflective layer, but not the underlayer, is formed by melting the reflective surface of the gelatin. The reflectivity of the hole or pit is then read by comparing the reflectivity of an adjacent non-pitted area. A comparison of these reflectivities leads to a relative contrast ratio measurement. Reflected light is read by a silicon cell, or by a photo multiplier tube. Frequently the recording medium will be rotated beneath a beam for recording or reading purposes. In this case, the recording medium is made in the shape of a disk, as shown in FIG. 1, with the central aperture used as a centering device on a spinner mechanism. In reading the disk, lower laser power is used than in writing, so that the surface of the disk will be illuminated, but melting will not occur. Alternatively, a laser of frequency different from the recording frequency could be used at the same, or even greater power.

F. Example

The following example is representative of the results derived from the recording material of this invention. Reflectivity measurements were made with the spectral reflectivity attachment to a Beckman DU-8 spectrophotometer, 20° incident angle. Absorption measurements were also made with the Beckman DU-8 spectrophotometer.

A commercial Konishiroku SN photoplate with an emulsion thickness of 6 microns was exposed to room light. After the plate was soaked in de-ionized water for one minute to promote even emulsion swelling, it was immersed for two minutes in a monobath of $Na_2SO_3$ 10 g, Elon 0.5 g, NaOH 2 gm, NaSCN 10 g with water brought to volume of 1 liter. The plate was washed for two minutes and then immersed in a coupler developer of $Na_2SO_3$ 18 g $Na_2CO_3$ 40 g, p amino N,N-diethylaniline 1 g/1 with 10 ml of a 10% solution of 1-naphthol in acetone. A laser recording material was formed that was very dense. The light that does come through when viewing a very bright white light source is blue. The sample 7/24/81 #3 was tested for sensitivity against a control sample (normal black development) with the following results:

TABLE 1

| Data Recording Conditions Pulse length $\mu$sec | Control No Dye | Amplitude of Data Signal by Reflective Reading in Millimeters 7/24/81 #3 Sample Dyed | Test Conditions |
| --- | --- | --- | --- |
| 15,000 | 25 | 30 | 830 nm laser |
| 10,000 | 26 | 30 | 5 $\mu$m beam |
| 1,000 | 20 | 30 | diameter |
| 500 | 20 | 26 | 3 mw on |
| 250 | 20 | 25 | surface of |
| 150 | 20 | 25 | media |
| 100 | 15 | 22 | |
| 75 | 10 | 25 | |

TABLE 1-continued

| Data Recording Conditions Pulse length μsec | Control No Dye | Amplitude of Data Signal by Reflective Reading in Millimeters 7/24/81 #3 Sample Dyed | Test Conditions |
|---|---|---|---|
| 50 | noise | 25 | |
| 25 | | 20 | |
| 15 | | noise | |

The dyed sample is shown to record well down to pulse lengths of 25 microseconds whereas the undyed sample did not perform well under 100 microseconds.

The light absorptive component of the media for which the dye is responsible was isolated by preparation of a plate in such a black development step and then bleaching out the reduced silver. In that experiment a light blue colored plate was created that absorbs 44% of the 830 nm light striking it. Bleaching of silver is normally not performed in making the recording material of the present invention, except for testing dye absorption.

A color coupler that is a close derivative of the coupler of the previous example was tried, and it was found that it would absorb 99% of the red light striking it. This coupler was 2,4-dichloronaphthol. Other blue couplers that work well are 4-chloronaphthol and 2,4-dibromonaphthol. A magenta coupler which produces optical densities of 4 at 514 nm is p-nitrophenyl acetonitrile. A laser recording material prepared in this way also performed well in the 830 nm recording test and should represent a large improvement in red sensitivity.

I claim:

1. A method of making a reflective laser recording and optical data storage medium comprising,
    forming a layer of silver precipitating nuclei from a portion of the silver halide within a photosensitive, silver-halide emulsion layer,
    contacting said nucleated emulsion layer with a chromogenic reducing agent and a chromogenic dye coupler whereby silver halide is converted into black filamentary silver particles and oxidized reducing agent formed in the reduction of said silver-halide couples with said dye coupler to form organic dye molecules in an underlayer, and
    forming a reflective metal layer over said underlayer.

2. The method of claim 1 wherein said reflective metal layer is formed by chemical vapor deposition or by sputtering.

3. A method of making a reflective optical data storage medium comprising,
    forming a layer of silver precipitating nuclei from a portion of the silver halide within a photosensitive silver-halide emulsion layer,
    contacting said nucleated emulsion with a monobath comprising a silver-halide solvent and a silver-reducing agent, whereby another portion of silver halide forms soluble silver ion complexes and is transported by diffusion transfer to said precipitating nuclei, where said silver ion complexes are reduced to non-filamentary silver particles to form a reflective surface layer in said emulsion,
    contacting said nucleated and monobath treated emulsion layer with a chromogenic reducing agent and a chromogenic dye coupler whereby remaining silver halide is converted into black filamentary silver particles and oxidized reducing agent formed in the reduction of said silver-halide couples with said dye coupler to form organic dye molecules in an underlayer beneath said reflective surface layer.

4. The method of claim 3 wherein said chromogenic dye coupler is 1-naphthol and said chromogenic reducing agent is p-amino diethylaniline which couple to form an organic dye molecule with absorptivity of red and infrared light.

5. A method of making a reflective optical data storage medium comprising,
    forming a layer of silver precipitating nuclei from a portion of the silver halide within a photosensitive silver-halide emulsion layer disposed on a substrate, the nuclei layer having a major surface distal to the substrate with a depthwise nuclei gradient with greatest nuclei density distal to the substrate,
    contacting said nucleated emulsion layer with a monobath comprising an active silver-halide solvent and a photographic developer of low reducing activity until reflective spheroid particles and agglomerates are formed on the nuclei in said nuclei layer, and
    contacting said nucleated and monobath treated emulsion layer with a strong chromogenic reducing agent and a chromogenic dye coupler whereby silver halide is converted into black filamentary silver particles and oxidized reducing agent formed in the reduction of said silver-halide couples with said dye coupler to form a light absorptive underlayer in said emulsion layer.

6. The method of claim 5 wherein said chromogenic coupler is 1-naphthol and said chromogenic reducing agent is p-amino diethylaniline which couple to form an organic dye molecule with absorptivity of red and infrared light.

* * * * *

UNITED STATES PATENT AND TRADEMARK OFFICE
CERTIFICATE OF CORRECTION

PATENT NO. : 4,383,024

DATED : May 10, 1983

INVENTOR(S) : Eric W. Bouldin

It is certified that error appears in the above—identified patent and that said Letters Patent is hereby corrected as shown below:

On the cover page, under "Related U.S. Application Data", after "Division of Ser. No. 301,230, Sep. 11, 1981, delete "abandoned" and insert in place thereof --now U.S. Patent 4,396,701--.

Signed and Sealed this

Second Day of October 1984

[SEAL]

Attest:

Attesting Officer

GERALD J. MOSSINGHOFF

Commissioner of Patents and Trademarks